United States Patent [19]

Sakaibara et al.

[11] Patent Number: 4,709,231
[45] Date of Patent: Nov. 24, 1987

[54] SHADING APPARATUS FOR DISPLAYING THREE DIMENSIONAL OBJECTS

[75] Inventors: Toru Sakaibara, Kokubunji; Shigeo Tsujioka, Higashiyamato; Toshinori Kajiura, Kawasaki; Toshihisa Aoshima, Tokyo; Motonobu Tonomura, Kokubunji, all of Japan

[73] Assignee: Hitachi, Ltd., Tokyo, Japan

[21] Appl. No.: 766,941

[22] Filed: Aug. 19, 1985

[30] Foreign Application Priority Data

Sep. 14, 1984 [JP] Japan ................... 59-191490

[51] Int. Cl.$^4$ .............................................. G09G 1/06
[52] U.S. Cl. .................... 340/729; 340/728; 340/747; 364/522
[58] Field of Search .............. 340/703, 728, 729, 725, 340/747; 364/521, 522

[56] References Cited

U.S. PATENT DOCUMENTS 4,475,104 10/1984 Shen ..................................... 340/729
4,586,038 4/1986 Sims et al. ........................... 340/729
4,615,013 9/1986 Yan et al. ............................ 364/521

OTHER PUBLICATIONS

Bui Tuong Phong, "Illumination for Computer Generated Pictures", Communication of ACM, 18(6), Jun. 1975, pp. 311 to 317.
J. D. Foly and A. Van Dam, "Fundamentals of Interactive Computer Graphics", Addison Wesely Publishing Company.
James F. Blinr, "Models of Light Reflection for Computer Synthesized Pictures", SIGGRAPH '77 Proceeding.

Primary Examiner—Gerald L. Brigance
Assistant Examiner—Jeffery A. Brier
Attorney, Agent, or Firm—Antonelli, Terry & Wands

[57] ABSTRACT

An apparatus for shading a polyhedron at high speed is disclosed which includes the combination of a polygon-scan line conversion processor and an inner product interpolation processor for obtaining a pair of inner products of vectors indicative of a relation among the direction of a normal, the direction of a light source and the direction of a view point each viewed at a point within a polygon having a plurality of vertices, on the basis of the position of said point in the polygon and the direction of a normal at each of the vertices, a table searched on the basis of the inner products of vectors and holding a series of brightness data which have previously been calculated for a series of values of each of the inner products of vectors, a buffer for storing the result of table search for the above table, and a D/A conversion circuit for converting the result of table search into a signal which is used as a brightness control signal in a display device.

7 Claims, 9 Drawing Figures

SHADING APPARATUS FOR DISPLAYING THREE DIMENSIONAL OBJECTS

BACKGROUND OF THE INVENTION

The present invention relates to an image processing apparatus, and more particularly to the shading of a displayed body in the processing of three-dimensional image data.

It has been well known that when a three-dimensional body is displayed on a display device of a pattern processing apparatus, such as a CRT display, the displayed body is shaded on the basis of a light reflection model, to display the body just as it would appear in reality. Such a shading technique is described, for example, in the following publications.

Bui Tuong Phong, "Illumination for Computer Generated Pictures", Communications of ACM, 18(6), June 1975, pages 311 to 317.

J. D. Foly and A. Van Dam, "Fundamentals of Interactive Computer Graphics", Addison Wesely Publishing Company.

James F. Blinn, "Models of Light Reflection for Computer Synthesized Pictures", SIGGRAPH '77 Proceeding.

Figure 2:
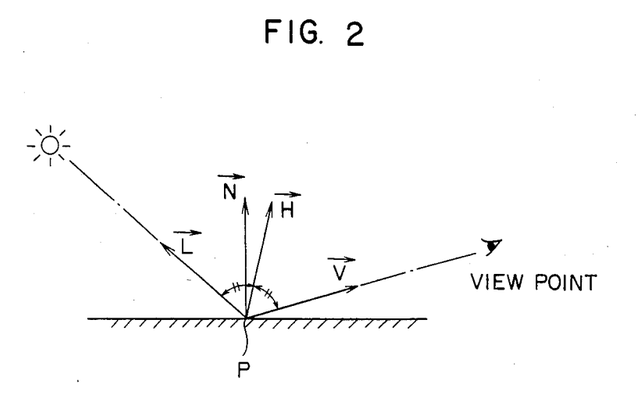
FIG. 2 is a schematic diagram showing a light reflection model.

Although details of the shading technique are described in the above publications (particularly in the book by J. D. Foly and A. Van Dam), the principle of shading based upon a reflection model will be summarized below. FIG. 2 shows a reflection model used by J. F. Blinn. In FIG. 2, reference symbol $\vec{N}$ designates a unit vector normal to a reflecting surface (namely, the unit normal vector of the reflecting surface), $\vec{L}$ a unit vector starting from a reflecting point P and directed to a light source, $\vec{V}$ a unit vector starting from the reflecting point P and directed to a view point, and $\vec{H}$ a unit vector in the direction of the sum vector of the vectors $\vec{L}$ and $\vec{V}$. Accordingly, the unit vector $\vec{H}$ is the bisector of an angle between the vector $\vec{L}$ and the vector $\vec{V}$. According to this model, the light intensity I at the view point is expressed by the following equation:

$$I = I_a K_a + I_p \{ K_d (\vec{N} \cdot \vec{L}) + K_s (\vec{N} \cdot \vec{H})^n \} \quad (1)$$

when $I_a$ indicates the intensity of ambient light, $K_a$ a reflection coefficient for ambient light, $I_p$ the intensity of light from a light source, $K_d$ a diffuse reflection coefficient, $K_s$ a specular reflection coefficient, and n a numeral value varying in a range from 10 to 1,000, depending upon the roughness of the reflecting surface. Incidentally, a mark "." in the equation (1) indicates the inner product of vectors.

Figure 3:
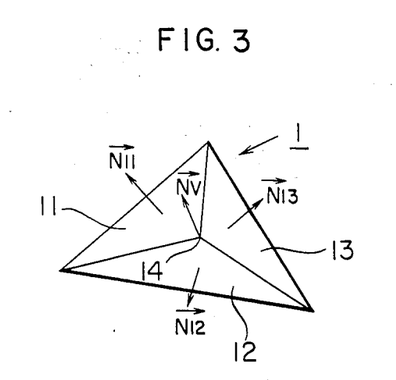
FIG. 3 is a schematic diagram showing a polyhedron, by which a to-be-displayed body is approximated.

A three-dimensional body which is bounded by a curved surface and is to be displayed, is first approximated by a polyhedron having a plurality of polygonal facets each called a patch surface, and then a unit normal vector at each vertex of the polyhedron is determined. FIG. 3 shows a polyhedron, by which a to-be-displayed body is approximated. Referring to FIG. 3, a polyhedron 1 has patch surfaces 11 to 13, and the unit normal vectors of the patch surfaces 11, 12 and 13 are expressed by $\vec{N}_{11}$, $\vec{N}_{12}$ and $\vec{N}_{13}$, respectively. A unit normal vector $\vec{N}_v$ at a vertex 14 is obtained by forming a unit vector along the average vector of the unit normal vectors $\vec{N}_{11}$, $\vec{N}_{12}$ and $\vec{N}_{13}$ of the patch surfaces 11, 12 and 13 which share the vertex 14. After the unit normal vectors at all vertices of the polyhedron have been determined in the above-mentioned manner, a unit normal vector at each point on an original curved surface corresponding to each patch surface is determined by the interpolation of a unit normal vector among vertices which define the patch surface. Then, the intensity of light reflected from each point on the surface of the to-be-displayed body toward the view point, that is, the brightness of each dot (namely, each pixel) on a display screen can be calculated from the equation (1). Thus, the surface of the displayed body can be shaded. Although the vector $\vec{H}$ is used in the above shading method, the vector $\vec{V}$ may be used instead of the vector $\vec{H}$. In this case, substantially the same result as in the above method is obtained, but the calculation of light intensity at the view point becomes complicated.

In a conventional shading apparatus, the inner products $(\vec{N} \cdot \vec{L})$ and $(\vec{N} \cdot \vec{H})$ have been calculated for each dot, and then the equation (1) has been calculated. Accordingly, it takes a lot of time to complete a displayed pattern.

SUMMARY OF THE INVENTION

A main object of the present invention is to provide a pattern shading apparatus which can shorten the processing time required for shading the displayed surface of a three-dimensional body.

In order to attain the above object, according to an aspect of the present invention, the brightness corresponding to various values of each of the inner products $(\vec{N} \cdot \vec{L})$ and $(\vec{N} \cdot \vec{H})$ is previously calculated and stored in tables. For example, the quantities $I_a$ and $I_p$ in the equation (1) can be considered to be constant for one patch surface. Accordingly, the equation (1) can be divided into two parts, one of which includes the first and second terms of the equation (1) and the other part includes only the third term. Thus, each part of the equation (1) can be treated as the function of one inner product of vectors. Accordingly, the equation (1) can be readily calculated by using two tables, one of which stores values of the inner product $(\vec{N} \cdot \vec{L})$ and the other of which stores values of the inner product $(\vec{N} \cdot \vec{H})$.

Further, according to another aspect of the present invention, in order to carry out the interpolation of inner product of vectors between two points, each vector is represented by a polar coordinate system. The vector $\vec{L}$ and the vector $\vec{V}$ (or $\vec{H}$) can be considered to be constant for one patch surface. Therefore, each of the inner products $(\vec{N} \cdot \vec{L})$ and $(\vec{N} \cdot \vec{H})$ necessary for calculating the brightness of each dot is a function of only the vector N. Further, when an appropriate polar coordinate system is used, each of the above inner products can be expressed by a trigonometric function of a coordinate angle $\theta$ of the vector N. Accordingly, instead of calculating the inner products $(\vec{N} \cdot \vec{L})$ and $(\vec{N} \cdot \vec{H})$ after having determined the vector N at each point by interpolation, the inner products themselves can be directly determined by interpolation, using the coordinate angle $\theta$ as a parameter.

DESCRIPTION OF THE PREFERRED EMBODIMENT

Figure 1:
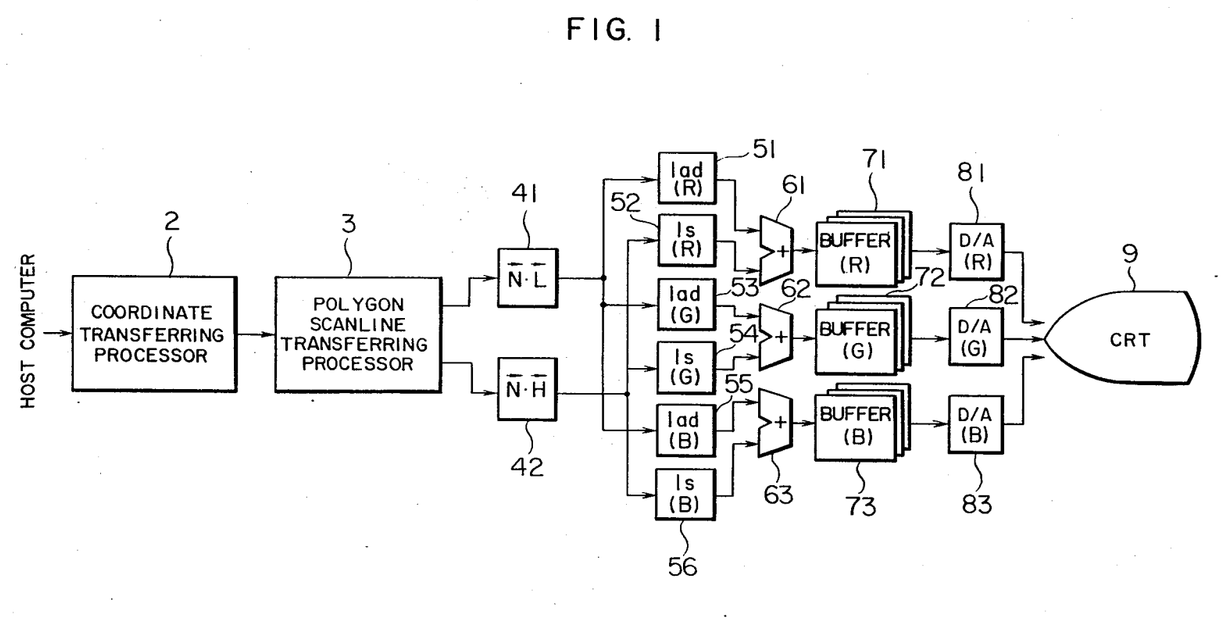
FIG. 1 is a block diagram showing an embodiment of a pattern shading apparatus according to the present invention.

FIG. 1 shows the whole construction of an embodiment of a pattern shading apparatus according to the present invention.

Referring to FIG. 1, a coordinate transformation processor 2 receives position coordinates of each vertex of a polyhedron, by which a to-be-displayed body is approximated, from a host computer (not shown), to perform coordinate transformation, such as the rotation or parallel displacement of coordinate axes, if necessary. Since such coordinate transformation has no direct connection with the present invention and is explained in detail in the previously-referred book by J. D. Foly and A. Van Dam, the explanation of the coordinate transformation processor 2 will be omitted. A polygon-scan line conversion processor 3 determines the positional coordinates, unit normal vector and polar coordinate representation of the inner products $(\vec{N}\cdot\vec{L})$ and $(\vec{N}\cdot\vec{H})$ for the starting and end points of each scan line, on the basis of coordinate information on the polyhedron, and then produces parameters which are to be supplied to inner product interpolation processors 41 and 42, on the basis of the above data. The function and operation of the polygon-scan line conversion processor 3 will be explained later in more detail. Although details of the inner product interpolation processor 41 will be described later, the processor 41 receives the above parameters, to calculate the inner product $(\vec{N}\cdot\vec{L})$ for each dot on each scan line by interpolation. similarly, the inner product interpolation processor 42 calculates the inner product $(\vec{N}\cdot\vec{H})$ for each dot by interpolation. Brightness tables 51 to 56 hold values of the brightness $I_{ad}=I_aK_a+I_pK_d(\vec{N}\cdot\vec{L})$ corresponding to values of the inner product $(\vec{N}\cdot\vec{L})$ and based upon the reflection of ambient light and the diffuse reflection of light from the light source, and values of the brightness $I_s=I_pK_s(\vec{N}\cdot\vec{H})^n$ corresponding to values of the inner product $(\vec{N}\cdot\vec{H})$ and based upon the specular reflection of light from the light source. Further, the tables 51 and 52 corespond to the red component of reflected light, the tables 53 and 54 correspond to the green component, and the tables 55 and 56 correspond to the blue component. The brightness information read out of the tables 51 to 56 is sent to adders 61 to 63, and values of $I_{ad}$ and $I_s$ which are read out of the above tables for the same color component are added to each other by a corresponding one of the adders 61 to 63. The outputs of the adders 61 to 63 are stored in frame buffers 71 to 73 dot by dot, and then respective contents of the buffers 71 to 73 are sent to a CRT display 9 through D/A converters 81 to 83, to control the brightness of the display screen of the CRT, thereby shading a displayed body.

FIGS. 4 to 8 serve to explain the processing carried out by the polygon-scan line conversion processor 3. The processor 3 determines a side vector indicative of each side of a patch surface, on the basis of position coordinates of each vertex of a polyhedron, determines the unit normal vector of the patch surface as the vector product of two side vectors, and then calculates a unit normal vector at each vertex in the previously-mentioned manner. Thereafter, the processor 3 determines the starting and end points of each scan line in the same manner as in an ordinary polygon-scan line conversion method, and then calculates the unit normal vectors at points on each scan line successively.

Figure 4:
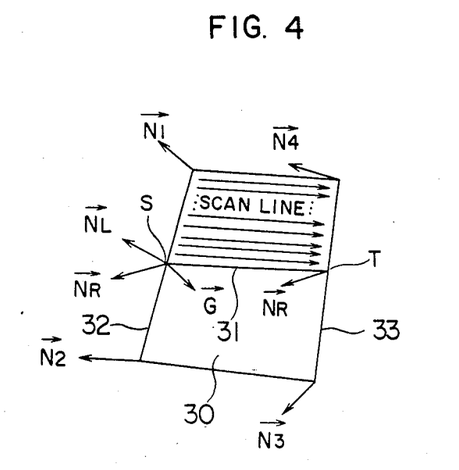
FIG. 4 is a schematic diagram for explaining the polygon-scan line conversion.
Figure 5:
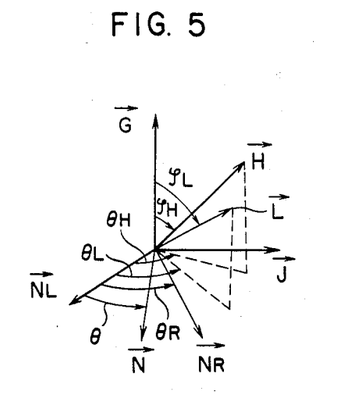
FIGS. 5 and 6 show the polar coordinate representation of vectors.

In more detail, referring to FIG. 4 which shows a patch surface 30, a unit normal vector $\vec{N}_L$ at a starting point S of a scan line 31 is calculated, by interpolation, from unit normal vectors $\vec{N}_1$ and $\vec{N}_2$ at two vertices which serve as respective ends of a side 32 containing the point S. Similarly, a unit normal vector $\vec{N}_R$ at end point T of the scan line 31 is calculated, by interpolation, from unit normal vectors $\vec{N}_3$ and $\vec{N}_4$ at two vertices which serve as respective ends of a side 33 containing the point T. Further, in order to make it easy to calculate the inner products $(\vec{N}\cdot\vec{L})$ and $(\vec{N}\cdot\vec{H})$ at each point on a scan line, a special coordinate system, that is, a polar coordinate system shown in FIG. 5 is used. In this polar coordinate system, the vector $\vec{N}_L$, the vector product $\vec{G}$ of the vectors $\vec{N}_L$ and $\vec{N}_R$, and the vector product $\vec{J}$ of the vectors $\vec{G}$ and $\vec{N}_L$ are used as coordinate axes. According to this coordinate system, a unit normal vector $\vec{N}$ at each dot position on the scan line is considered to change from the vector $\vec{N}_L$ to the vector $\vec{N}_R$ on the $\vec{N}_L$-$\vec{J}$ plane through a shorter path. In other words, an angle $\theta$ between the vector $\vec{N}_L$ and the vector $\vec{N}$ is changed from 0 to $\theta_R$ (where $-\pi<\theta_R<\pi$) in a direction in which the angle between the vector $\vec{N}_L$ and the vector $\vec{N}_R$ is less than $\pi$. Incidentally, in the above coordinate system, a given unit vector $\vec{X}$ can be represented by two polar coordinates, that is, an angle $\theta_Y$ between the vector $\vec{X}$ and the vector $\vec{G}$ and an angle $\theta_X$ between the projection of the vector $\vec{X}$ onto the $\vec{N}_L$-$\vec{J}$ plane and the vector $\vec{N}_L$. In FIG. 5, angles $\phi_H$ and $\theta_H$ are polar coordinates of the vector $\vec{H}$, and angles $\phi_L$ and $\theta_L$ are polar coordinates of the vector $\vec{L}$.

Now, detailed explanation will be made of how to determine the polar coordinates $\phi_X$ and $\theta_X$ of a given unit vector $\vec{X}$. First, the angle $\phi_X$ between the vector G and the vector X is given by the following equation:

$$\phi_X = \cos^{-1}(G\cdot X)$$

where $0 \leq \phi_X \leq \pi$.

Figure 6:
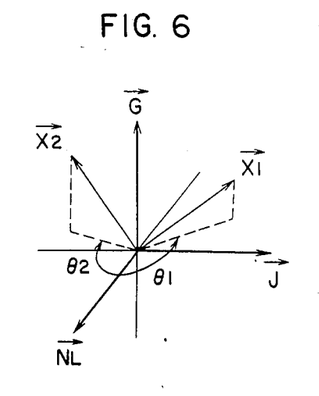

Since the coordinate angle $\theta$ of the vector $\vec{N}$, as mentioned above, changes from zero to $\theta_R$ through a shorter path, the angle $\theta_X$ can take a value satisfying a formula $-\pi<\theta_X<\pi$. For example, a vector $\vec{X}_1$ shown in FIG. 6 is considered to be rotated from the vector $\vec{N}_L$ in a positive direction through an angle $\theta_1$ and a vector $\vec{X}_2$ is considered to be rotated from the $\vec{N}_L$ in a negative direction through an angle $\theta_2$.

Figure 7:
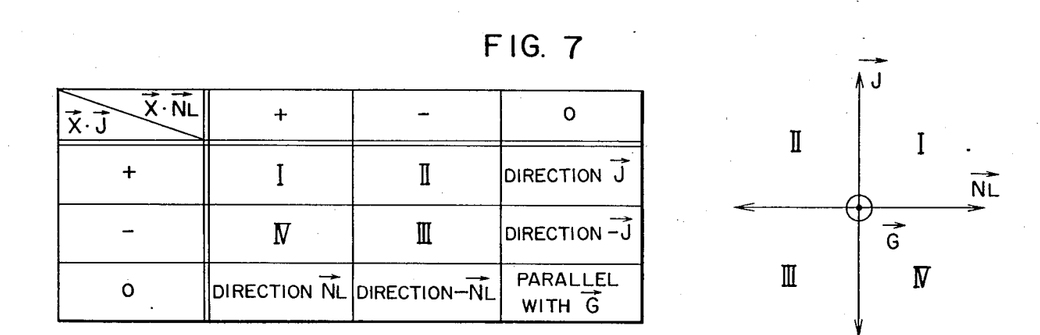
FIG. 7 shows the relation between component values of a vector $\vec{X}$ in a polar coordinate system and a quadrant where the projection of the vector $\vec{X}$ onto a $\vec{N}_L$-$\vec{J}$ plane is present.
Figure 8:
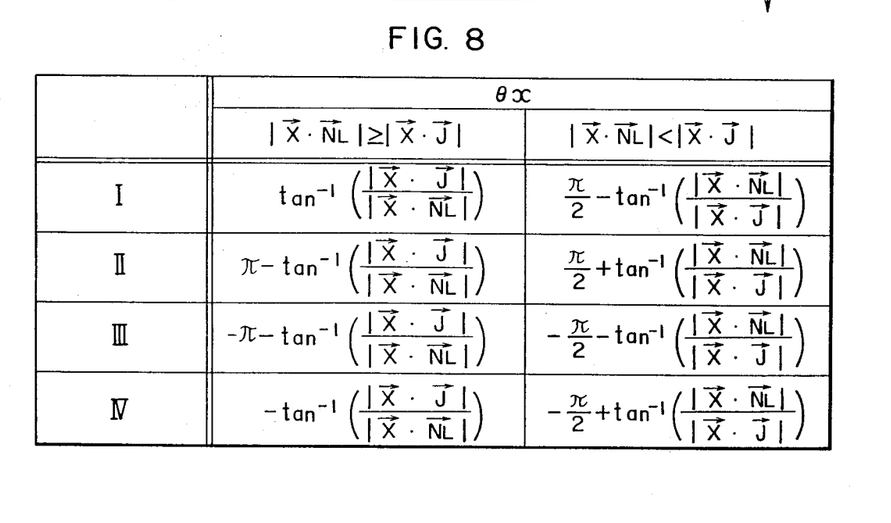
FIG. 8 shows formulae which are used for calculating a coordinate angle $\theta_X$ of the vector $\vec{X}$ in accordance with a quadrant where the above projection is present.

FIG. 7 shows the relation between a quadrant where the projection of the vector X onto the $\vec{N}_L$-$\vec{J}$ plane is present, and values of inner products $(\vec{X}\cdot\vec{N}_L)$ and $(\vec{X}\cdot\vec{J})$, and FIG. 8 shows those formulae for calculating an angle $\theta_X$ which are used in accordance with a quadrant where the projection of the vector $\vec{X}$ onto the $\vec{N}_L$-$\vec{J}$ plane is present, and depending upon whether or not the absolute value of the inner product $(\vec{X} \cdot \vec{N}_L)$ is smaller than the absolute value of the inner product $(\vec{X} \cdot \vec{J})$. In other words, the angle $\theta_X$ can be calculated by one of the above formulae. In a case where the value of at least one of the inner products $(\vec{X} \cdot \vec{N}_L)$ and $(\vec{X} \cdot \vec{J})$ is equal to zero, the angle $\theta_X$ can be determined directly from the relation shown in FIG. 7. In the above explanation, a relation $\vec{N}_L \neq \vec{N}_R$ is assumed. However, in a case where $\vec{N}_L = \vec{N}_R$, that is, $\vec{N}_L \times \vec{N}_R = 0$, a given vector perpendicular to the vector $\vec{N}_L$ can be used as the vector $\vec{G}$. In a case where $\vec{N}_L = -\vec{N}_R$, unit normal vectors at opposite ends of a patch surface are anti-parallel. Such a case scarcely happens, and can be avoided by increasing the patch surfaces of the polyhedron.

The angles $\phi_H$, $\phi_L$, $\theta_H$ and $\theta_L$ shown in FIG. 5 can be determined in the above-mentioned manner. Further, the angle $\theta$ for each dot on a scan line is increased from 0 to $\theta_R$ in such a manner that the angle $\theta$ is incremented by a small angle $\Delta\theta$ at intervals of one dot. Accordingly, the angle $\Delta\theta$ can be obtained by dividing the angle $\theta_R$ by a numerical value equal to the difference between the number of dots on a scan line and one (1).

In brief, the polygon-scan line conversion processor 3 calculates the above-mentioned angles $\phi_H$, $\phi_L$, $\theta_H$, $\theta_L$ and $\Delta\theta$, which are supplied to the inner product interpolation processors 41 and 42.

Next, explanation will be made of the inner product interpolation processors 41 and 42. Referring back to FIG. 5, the inner product $(\vec{N} \cdot \vec{L})$ can be expressed by the following equation:

$$(\vec{N} \cdot \vec{L}) = \cos\theta \cdot \sin\phi_L \cdot \cos\theta_L + \sin\theta \cdot \sin\phi_L \cdot \sin\theta_L = \tfrac{1}{2}\{\sin(\phi_L + \theta_L - \theta) + \sin(\phi_L - \theta_L + \theta)\} \quad (2)$$

Similarly, the inner product $(\vec{N} \cdot \vec{H})$ can be expressed by the following equation:

$$(\vec{N} \cdot \vec{H}) = \tfrac{1}{2}\{\sin(\phi_H + \theta_H - \theta) + \sin(\phi_H - \theta_H + \theta)\} \quad (3)$$

Usually, the distance between a patch surface and each of the light source and the view point is far larger, as compared with dimensions of the patch surface, and hence the vectors $\vec{L}$ and $\vec{H}$ are considered to be constant for all points on one patch surface. Accordingly, each of the equations (2) and (3) is a function of only the angle $\theta$, and the angle $\theta$ is successively incremented by $\Delta\theta$, to change from 0 to $\theta_R$.

Figure 9:
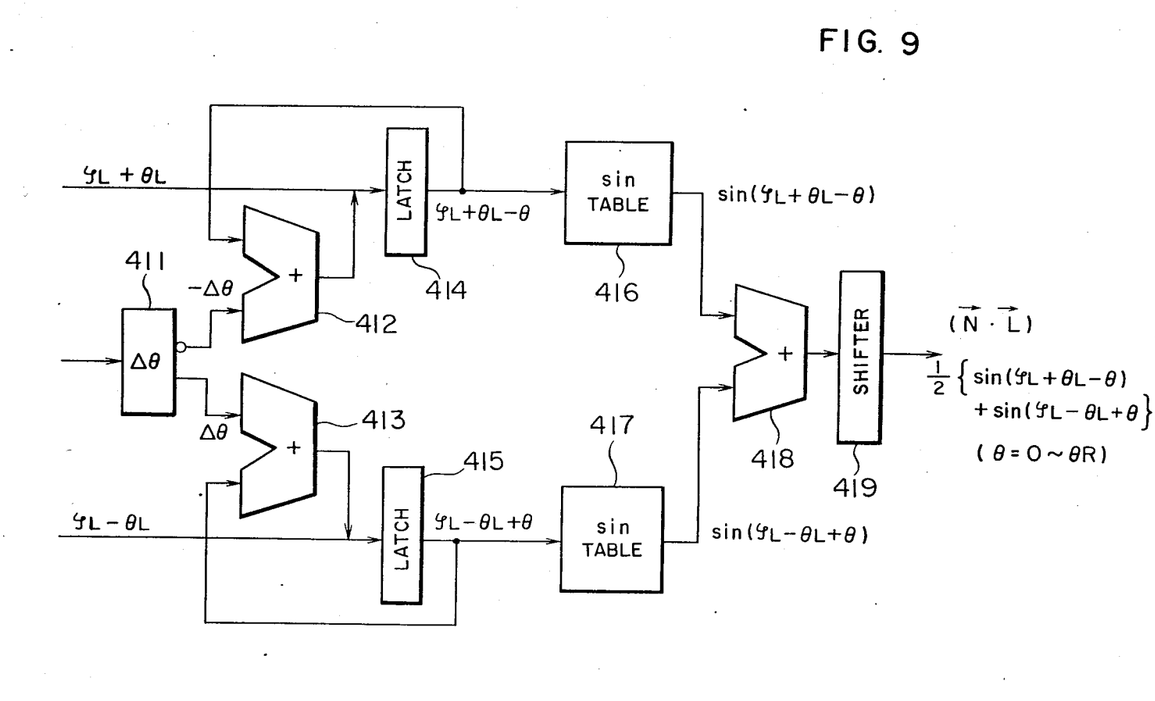
FIG. 9 is a block diagram showing the inner product interpolation processor of FIG. 1.

FIG. 9 shows the construction of the inner product interpolation processor 41 for calculating the inner product $(\vec{N} \cdot \vec{L})$. Referring to FIG. 9, a latch circuit 411 holds an angle $\Delta\theta$ which is supplied from the polygon-scan line conversion processor 3, and supplies a value $-\Delta\theta$ and another value $\Delta\theta$ to one input terminal of an adder 412 and one input terminal of an adder 413, respectively. The other input terminal of the adder 412 receives the output of a latch circuit 414. A value $\phi_L + \theta_L$ from the polygon-scan line conversion processor 3 is applied, as an initial value, to the latch circuit 414. The other input terminal of the adder 413 receives the output of a latch circuit 415. A value $\phi_L - \theta_L$ from the polygon-scan line conversion processor 3 is applied, as an initial value, to the latch circuit 415. The outputs of the adders 412 and 413 are applied to the latch circuits 414 and 415, respectively. Accordingly, the contents of the latch circuits 414 and 415 are successively decremented and incremented by $\Delta\theta$, respectively, for a series of dots on a scan line. Thus, the latch circuits 414 and 415 can hold values $(\phi_L = \theta_L - \theta)$ and $(\phi_L - \theta_L + \theta)$ for a dot now scanned, respectively. Sine tables 416 and 417 are searched on the basis of the outputs of the latch circuits 414 and 415, and deliver sine values of the above outputs. The sine values from the tables 416 and 417 are added to each other by an adder 418. A shifter 419 performs a shifting operation for the output of the adder 418 so as to deliver one-half of this output, namely, a value given by the equation (2).

The inner product interpolation processor 42 for the inner product $(\vec{N} \cdot \vec{H})$ is used for calculating the equation (3). The processor 43 has the same construction as shown in FIG. 9, excepting that the angles $\phi_H$ and $\theta_H$ are used in place of the angles $\theta_L$ and $\theta_L$.

The output of the inner product interpolation processor 41 is used for searching the brightness tables 51, 53 and 55, and the output of the inner product interpolation processor 42 is used for searching the brightness tables 52, 54 and 56. The equation (1) can be divided into the following two equations:

$$I_{ad} = I_a K_a + I_p K_d (\vec{N} \cdot \vec{L}) \quad (4)$$

$$I_s = I_p K_s (\vec{N} \cdot \vec{H})^n \quad (5)$$

The equation (4) indicates the light intensity based upon the reflection of ambient light and the diffuse reflection of light from the light source, and the equation (5) indicates the light intensity based upon the specular reflection of light from the light source. That is, the equations (4) and (5) correspond to two components of the brightness of a displayed body. The values of the equations (4) and (5) with respect to each of red-, green- and blue-components are previously calculated for those values of the inner products $(\vec{N} \cdot \vec{L})$ and $(\vec{N} \cdot \vec{H})$ which are given at an appropriate interval, using reflection coefficients of a to-be-displayed body with respect to the above-mentioned three kinds of reflection, the intensity of ambient light, the intensity of light from the light source, and the value of n. The values of the equation (4) for each of the red-, green- and blue-components are stored in the tables 51, 53 and 55, respectively, and the values of the equation (5) for each of the red-, green- and blue-components are stored in the tables 52, 54 and 56, respectively. For example, in a case where the values of each of the inner products $(\vec{N} \cdot \vec{L})$ and $(\vec{N} \cdot \vec{H})$ are given at intervals of 1/256, the number of entries included in each of the tables 51 to 56 is made equal to 257. That is, the value of the equation (4) or (5) obtained when the value of the inner product $(\vec{N} \cdot \vec{L})$ or $(\vec{N} \cdot \vec{H})$ is zero, is stored in the first entry, the value of the equation (4) or (5) corresponding to the value of the inner product equal to 1/256 is stored in the second entry, the value of the equation (4) or (5) corresponding to the value of the inner product equal to 255/256 is stored in the two hundred fifty sixth entry, and the value of the equation (4) or (5) corresponding to the value of the inner product equal to 1 (one) is stored in the two hundred fifty seventh entry. The values of each of the equations (4) and (5) may be calculated by the host computer or may be calculated by a processor attached to the display device.

According to the present embodiment, the brightness tables are used, and hence the calculation of the equation (1) can be achieved only by one table searching process and one adding process after the values of the inner products $(\vec{N} \cdot \vec{L})$ and $(\vec{N} \cdot \vec{H})$ have been determined. While, according to a conventional method, even when the values of $I_a K_a$, $I_p K_d$ and $I_p K_s$ have previously been calculated, two multiplying operations and two adding operations are required for calculating the equation (1). Further, even when a time required for calculating the values stored in the tables 51 to 56 is taken into consideration, the present invention is superior to the conventional method, since a displayed body generally includes a large number of dots having the same values of the inner products (N·L) and $(\overline{\text{N·H}})$.

Further, according to the present embodiment, the calculation of the inner products $(\overline{\text{N·L}})$ and $(\overline{\text{N·H}})$ at each dot includes two adding processes and one table searching process. While, according to the conventional method, six multiplying operations and four adding operations are required for calculating the above inner products.

As has been explained in the foregoing, a pattern shading apparatus according to the present invention includes a brightness table. Thus, a time necessary for obtaining the brightness of each dot on the basis of the values of the inner products is greatly reduced. Further, according to the present invention, a time required for calculating the inner products by interpolation can be greatly shortened by using a polar coordinate system.

We claim:

1. A pattern shading apparatus comprising:
   means for obtaining a first signal indicative of a relation among the direction of a normal, the direction of a light source and the direction of a view point each viewed at a point within a polygon having a plurality of vertices, on the basis of the position of said point in said polygon and the direction of a normal at each of said vertices;
   a table for holding a series of brightness data, said brightness data being previously calculated for a series of values of said first signal, said table being searched on the basis of said first signal; and
   means of converting the result obtained by the table search into a signal used in display means;
   wherein said table includes a first table for holding a series of brightness data based upon a reflection of ambient light and a diffuse reflection of light from the light source and a second table for holding a series of brightness data based upon a specular reflection of light from the light source, and said first and second tables are searched on the basis of said first signal, and wherein said table further includes adding means for adding the result of search for said first table and the result of search for said second table to each other.

2. A pattern shading apparatus according to claim 1, wherein said conversion means includes a frame memory having storage locations corresponding to dots on a display screen of said display means, and the result obtained by the table search is stored in a corresponding one of said storage locations.

3. A pattern shading apparatus comprising:
   means for obtaining a first signal indicative of a relation along the direction of a normal, the direction of a light source and the direction of a view point each viewed at a point within a polygon having a plurality of vertices, on the basis of the position of said point in said polygon and the direction of a normal at each of said vertices;
   a table for holding a series of brightness data, said brightness data being previously calculated for a series of values of said first signal, said table being searched on the basis of said first signal; and
   means of converting the result obtained by the table search into a signal used in display means;
   wherein said means for obtaining said first signal includes first means for determining the direction of a normal at a first point on a first side of said polygon on the basis of the direction of a normal at each of vertices serving as both ends of said first side and for determining the direction of a normal at a second point on a second side of said polygon on the basis of the direction of a normal at each of vertices serving as both ends of said second side, and second means for obtaining said first signal indicative of a relative among the direction of a normal, the direction of the light source and the direction of the view point each viewed at a third point on a straight line connecting said first point and said second point, on the basis of the position of said third point on said straight line, the direction of a normal at said first point, and the direction of a normal at said second point.

4. A pattern shading apparatus according to claim 3, wherein said second means obtains said first signal by regarding each of the direction of the light source and the direction of the view point as constant at every point in said polygon.

5. A pattern shading apparatus according to claim 3, wherein second means includes third means for assigning part of an angle between the direction of a normal at said first point and the direction of a normal at said second point to said third point in accordance of the position of said third position on said straight line connecting said first point and said second point, and fourth means for obtaining said first signal expressed by a relation among the assigned angle, the direction of the light source, and the direction of the view point.

6. A pattern shading apparatus according to claim 5, wherein said fourth means includes a third table searched on the basis of said assigned angle and an angle between the direction of the light source and the direction of a normal at said first point and holding a series of values of a second signal with respect to the direction of the light source, and a fourth table searched on the basis of said assigned angle and an angle between the direction of the view point and the direction of a normal at said first point and holding a series of values of a third signal with respect to the direction of the view point.

7. A pattern shading apparatus comprising:
   first means for determining the direction of a normal at a first point on a first side of a polygon having a plurality of vertices on the basis of the direction of a normal at each of vertices serving as both ends of said first side and for determining the direction of a normal at a second point on a second side of said polygon on the basis of the direction of a normal at each of vertices serving as both ends of said second side, to generate first, second and third parameters on the basis of the direction of a normal at each of said first and second points, said first means including means for obtaining a first angle between the direction of a light source and the direction of a normal to a plane containing the direction of a normal at said first point and the direction of a normal at said second point and a second angle between a component of the direction of the light source parallel to said plane and the direction of a normal at said first point to deliver said first and second angles as said first parameter, means for obtaining a third angle between the direction of a normal to said plane and the direction of the bisector of an angle formed between the direction of the light source and the direction of a view point and a fourth angle between the projection of said bisector onto said plane and the direction of a normal at said first point to deliver said third and fourth angles as said second parameter, and means for dividing a fifth angle between the direction of a normal at said first point and the direction of a normal at said second point by the distance between said first point and said second point to deliver a value obtained by the division as said third parameter;

second means applied with said first, second and third parameters for delivering a pair of inner products of vectors indicative of a relation among the direction of a normal, the direction of the light source and the direction of the view point each viewed at each of points on a straight line connecting said first point and said second point, said second means including means for determining a first value at each point on said straight line connecting said first point and said second point on the basis of said first parameter and an accumulated value of said third parameter, a first table searched on the basis of said first value and holding a series of values of an inner product of vectors which is concerned with the direction of the light source, means for determining a second value at each of points on said straight line connecting said first point and said second point on the basis of said second parameter and an accumulated value of said third parameter, a second table searched on the basis of said second value and holding a series of values of another inner product of vectors which is concerned with the direction of the view point, and means for adding up the results of table search which is made for said first and second tables on the basis of said first and second values, to deliver a value indicative of that relation among the direction of a normal, the direction of the light source and the direction of the view point which is obtained at each point on said straight line; and means for determining the brightness of each point on said straight line connecting said first point and said second point on the basis of said inner products of vectors, to display the brightness on a display device.

* * * * *